United States Patent
Oh et al.

(10) Patent No.: US 6,660,053 B2
(45) Date of Patent: Dec. 9, 2003

(54) GRILL ASSEMBLY OF CYCLONE DUST COLLECTING APPARATUS FOR VACUUM CLEANER

(75) Inventors: Jang-keun Oh, Gwangju (KR); Jung-seon Park, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 0 days.

(21) Appl. No.: 10/082,452

(22) Filed: Feb. 25, 2002

(65) Prior Publication Data

US 2003/0014952 A1 Jan. 23, 2003

(30) Foreign Application Priority Data

Jul. 19, 2001 (KR) .................................. 10-2001-43286

(51) Int. Cl.[7] .............................................. B01D 45/12
(52) U.S. Cl. ...................... 55/337; 55/413; 55/459.1; 55/DIG. 3
(58) Field of Search ..................... 55/337, 424, 426, 55/459.1, 413, DIG. 3; 15/350, 353

(56) References Cited

U.S. PATENT DOCUMENTS

| | | | | |
|---|---|---|---|---|
| 1,702,804 A | * | 2/1929 | Winslow | .................... 96/321 |
| 2,071,975 A | * | 2/1937 | Holm-Hansen et al. | ....... 55/413 |
| 2,942,691 A | * | 6/1960 | Dillon | ........................ 55/426 |
| 6,042,628 A | | 3/2000 | Nishikiori et al. | |
| 6,269,518 B1 | * | 8/2001 | Yung | ........................... 15/352 |

FOREIGN PATENT DOCUMENTS

| | | |
|---|---|---|
| DE | 29709879 | 8/1997 |
| GB | 657375 | 9/1951 |
| GB | 1214730 | 12/1968 |
| GB | 2264444 | 9/1993 |
| GB | 2298598 | 9/1996 |
| GB | 2375980 | 12/2002 |
| GB | 2376197 | 12/2002 |
| JP | 2001 121040 | 5/2001 |

\* cited by examiner

*Primary Examiner*—Robert A. Hopkins
(74) *Attorney, Agent, or Firm*—Ladas & Parry

(57) ABSTRACT

A grill assembly of a cyclone dust collecting apparatus for a vacuum cleaner capable of improving dust collecting function of the vacuum cleaner by preventing dust from being drawn to a vacuum-generating device after passing through a grill. The grill assembly is disposed at an upper part of an air discharge passage of a cyclone body for separating dust from a whirling air current by a centrifugal force by forming the whirling air current from a drawn air. The grill assembly prevents dust from being drawn into the vacuum-generating device of the vacuum cleaner. The grill assembly includes a grill body having a plurality of passages formed therein and a filter disposed along an interior wall of the grill body for filtering dust drawn into the grill body through the plurality of passages.

10 Claims, 5 Drawing Sheets

GRILL ASSEMBLY OF CYCLONE DUST COLLECTING APPARATUS FOR VACUUM CLEANER

BACKGROUND OF THE INVENTION

1. Field of the Invention

The present invention relates to a cyclone dust collecting apparatus for a vacuum cleaner, and more particularly to a grill assembly of a cyclone dust collecting apparatus for a vacuum cleaner used for preventing dust from being drawn into a vacuum-generating device.

2. Description of the Related Art

FIG. 1 shows a conventional cyclone dust collecting apparatus for a vacuum cleaner. According to FIG. 1, the conventional cyclone dust collecting apparatus 10 for a vacuum cleaner comprises a cyclone body 20 and a dust-collecting portion 30.

An air suction passage 21 connected with a brush assembly (not shown) of the vacuum cleaner is disposed at an upper part of the cyclone body 20. An air drawn through the air suction passage 21 flows into a tangential direction of the cyclone body 20 and forms a whirling air current.

An air discharge passage 22 connected with a vacuum-generating device (not shown) of the vacuum cleaner is disposed at an upper central part of the cyclone body 20. In order to prevent dust from being drawn into the vacuum-generating device, a grill 23 is disposed at an inlet of the air discharge passage 22.

The grill 23 has a plurality of passages 24 formed therein. When the vacuum-generating device of the vacuum cleaner operates, the air containing all kinds of filth that exists on a cleaning surface is drawn into the cyclone body 20 through the brush assembly and the air suction passage 21.

The air drawn into the cyclone body 20 forms a whirling air current, and the dust included in the air is separated by centrifugal force and collected in the dust-collecting portion 30. Then, the air flows to the vacuum-generating device through the passages 24 of the grill 23 and the air discharge passage 22.

On the other hand, some of the filth that has not been separated from the air passes through the grill 23 via the passages 24 of the grill 23, and flows to the vacuum-generating device through the air discharge passage 22 and deteriorates dust-collecting function of the vacuum cleaner. Thus, there is a need for an improved vacuum cleaner grill assembly to avoid this problem.

SUMMARY OF THE INVENTION

The present invention relates to a grill assembly of a cyclone dust collecting apparatus for a vacuum cleaner that is capable of improving dust collecting function of the vacuum cleaner by preventing dust from being drawn to the vacuum-generating device after passing through a grill.

The grill assembly of a cyclone dust collecting apparatus for a vacuum cleaner according to the present invention is disposed at an upper part of an air discharge passage of a cyclone body for separating dust from a whirling air current by centrifugal force. The whirling air current is formed from drawn air, and the grill assembly prevents dust from being drawn to a vacuum-generating device of the vacuum cleaner. The grill assembly comprises a grill body having a plurality of passages formed therein and filtering means disposed along an interior wall of the grill body for filtering dust drawn into the grill body through the passages.

In addition, the grill body has a plurality of passages formed therein, and a cylindrical form that has openings at both ends. In addition, a sealing member removably connected with the grill body is provided for sealing one open end of the grill body. In order to filter dust drawn into the grill body through the passages, filtering means is disposed along an interior wall of the grill body.

In a preferred embodiment of the present invention, the filtering means comprises a filter support portion integrally formed with the sealing member and a filter attached at the filter support portion.

DETAILED DESCRIPTION OF THE PREFERRED EMBODIMENT

The preferred embodiment of the present invention will be described in great detail by referring the appended drawings.

Figure 1:
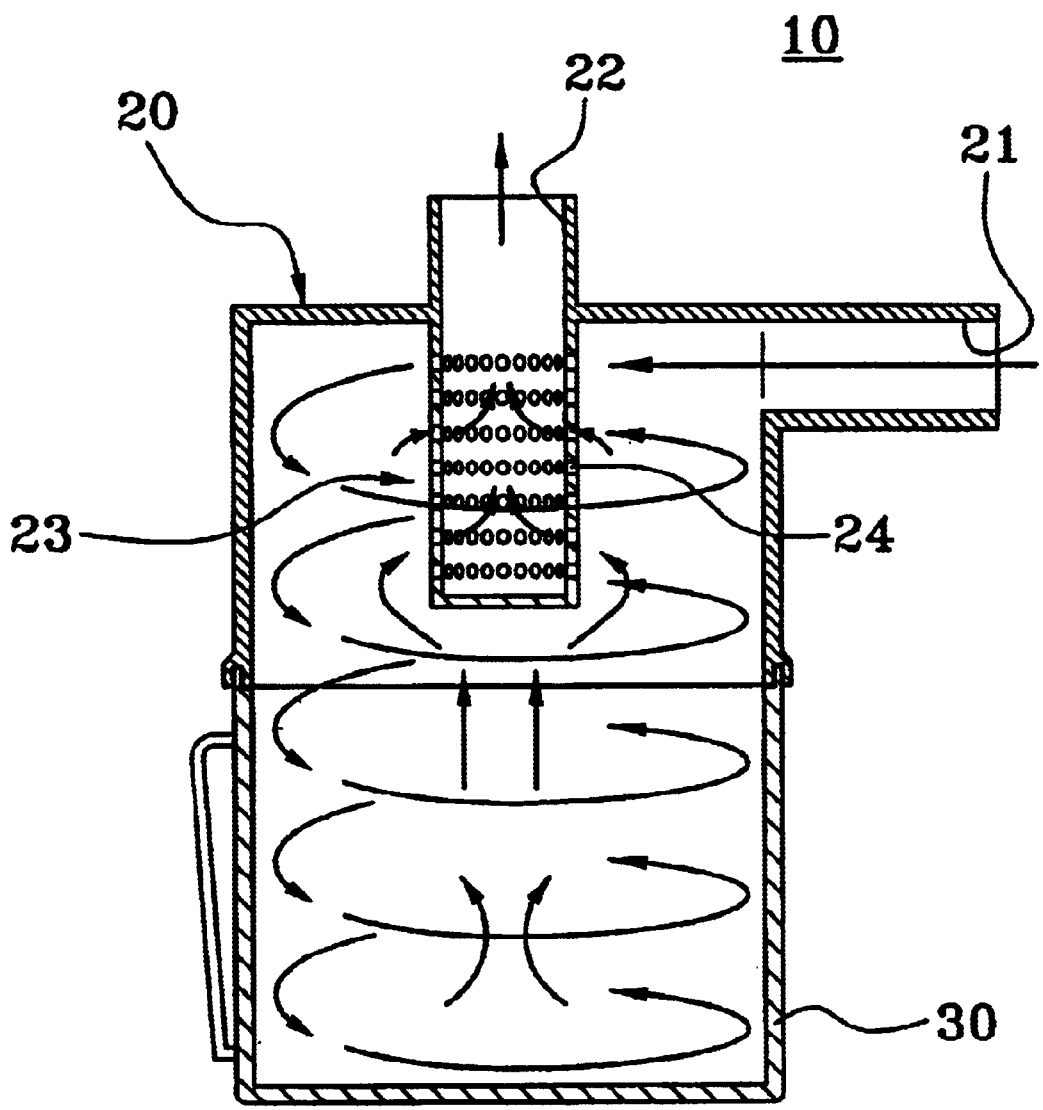
FIG. 1 is a sectional view showing a conventional dust collecting apparatus for a vacuum cleaner.
Figure 2:
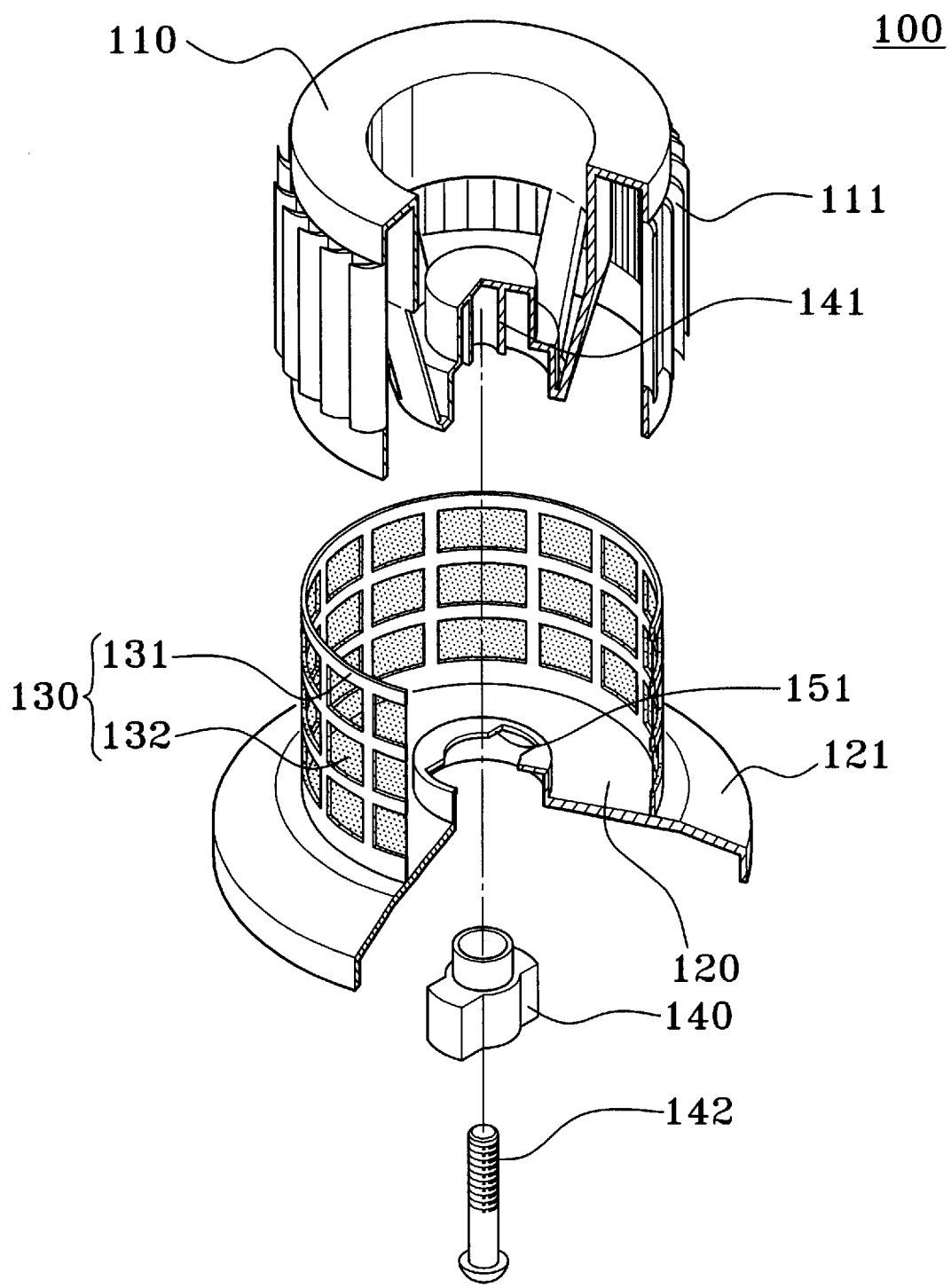
FIG. 2 is an exploded perspective view showing a grill assembly of a dust collecting apparatus for a vacuum cleaner according to the present invention.

FIG. 2 shows a grill assembly of a cyclone dust collecting apparatus for a vacuum cleaner according to the present invention. The grill assembly 100 of the cyclone dust collecting apparatus for a vacuum cleaner comprises a grill body 110, a sealing member 120, and filtering means 130.

The grill body 110 has a plurality of passages 111 formed therein. The grill body 110 is a cylindrical type having openings at both ends. An upper opening is connected with an air discharge passage 22 and a lower opening is sealed by the sealing member 120.

A dust backflow prevent unit 121 is formed at an outer circumference of the sealing member 120. The filth backflow prevent unit 121 shifts a direction of dust included in an air current towards the grill body 110 towards a whirling air current of the cyclone dust collecting apparatus 10.

The filtering means 130 includes a filter support portion 131 and a filter 132 supported by the filter support portion 131. The filter support portion 131 is integrally formed with the sealing member 120, and the filter 132 is mounted on the filter support portion 131.

Figure 3:
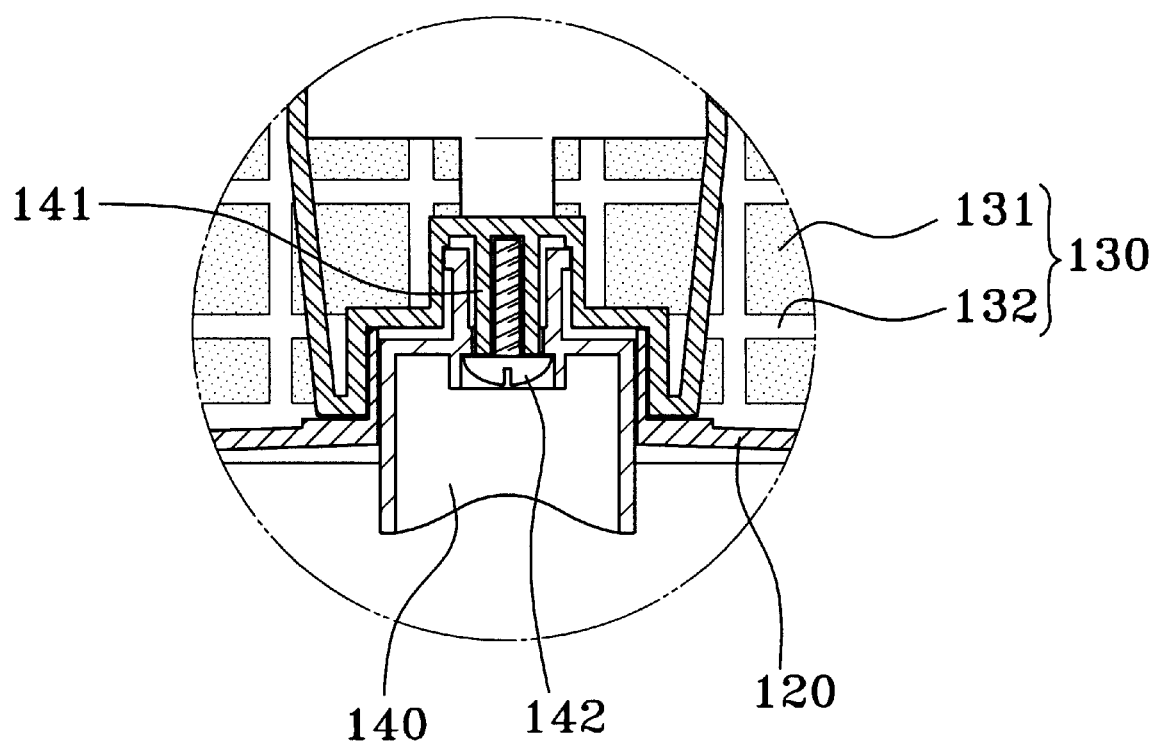
FIG. 3 is a sectional view of an assembled grill assembly.

On the other hand, the grill body 110 has a locking knob 140 disposed at a lower part thereof. As shown in FIG. 3, a hinge shaft 141 is protruded from a lower side of the grill body 110, and the locking knob 140 is rotatably connected with the hinge shaft 141 by a screw 142.

Figure 4:
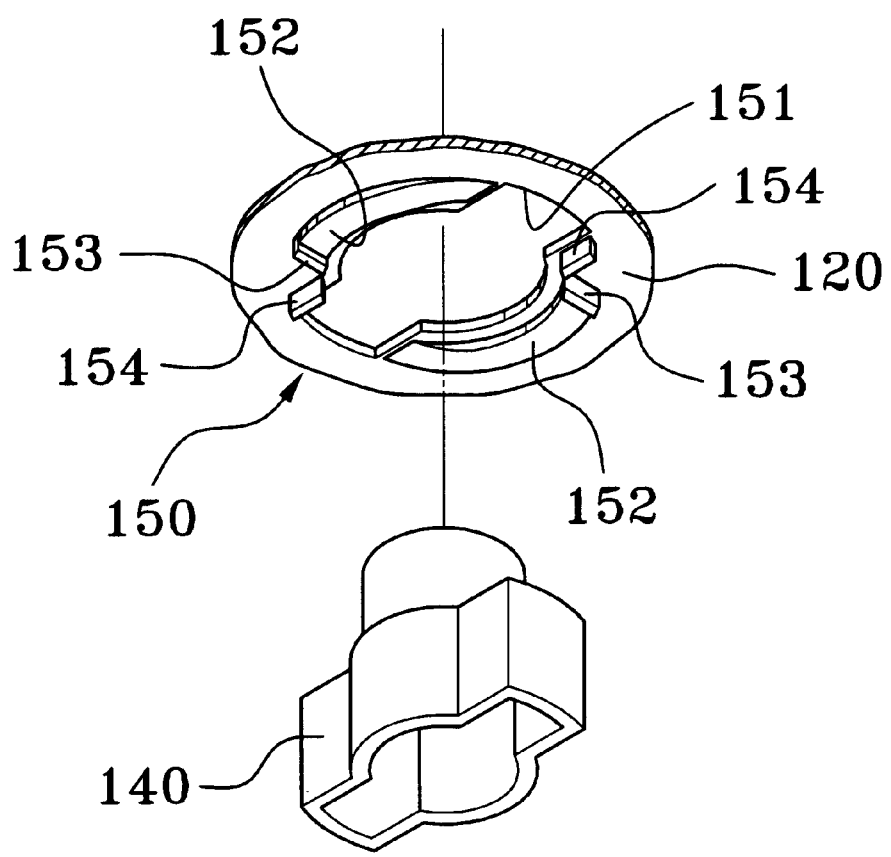
FIG. 4 is a perspective view showing a connection of a knob of the grill assembly of FIG. 2.

As shown in FIG. 4, a knob connect portion 150 is provided, corresponding to the sealing member 120. A penetrating hole 151 for receiving the locking knob 140 is formed in the knob connect portion 150, and a cam unit 152 is disposed around the penetrating hole 151.

The cam unit 152 is formed such that a locking position is 0.5 mm higher than an unlocking position. Therefore, the sealing member 120 is firmly secured to the grill body 110 due to an interrelated movement of the locking knob 140 on the cam unit 152.

In other words, when the locking knob 140 is turned 90° after passing through the penetrating hole 151, the sealing member 120 will be firmly secured to the grill body 110. Thus, the sealing member 120 can be releasably attached and detached to and from the grill body 110 without using any special tools.

Also, maintenance and repair of the grill assembly 100 or cleaning of the filter 132 becomes convenient. The undesignated numerals 153 and 154 of FIG. 4 are stoppers protruded from the sealing member 120 in order to control the locking position and the unlocking position of the locking knob 120.

Figure 5:
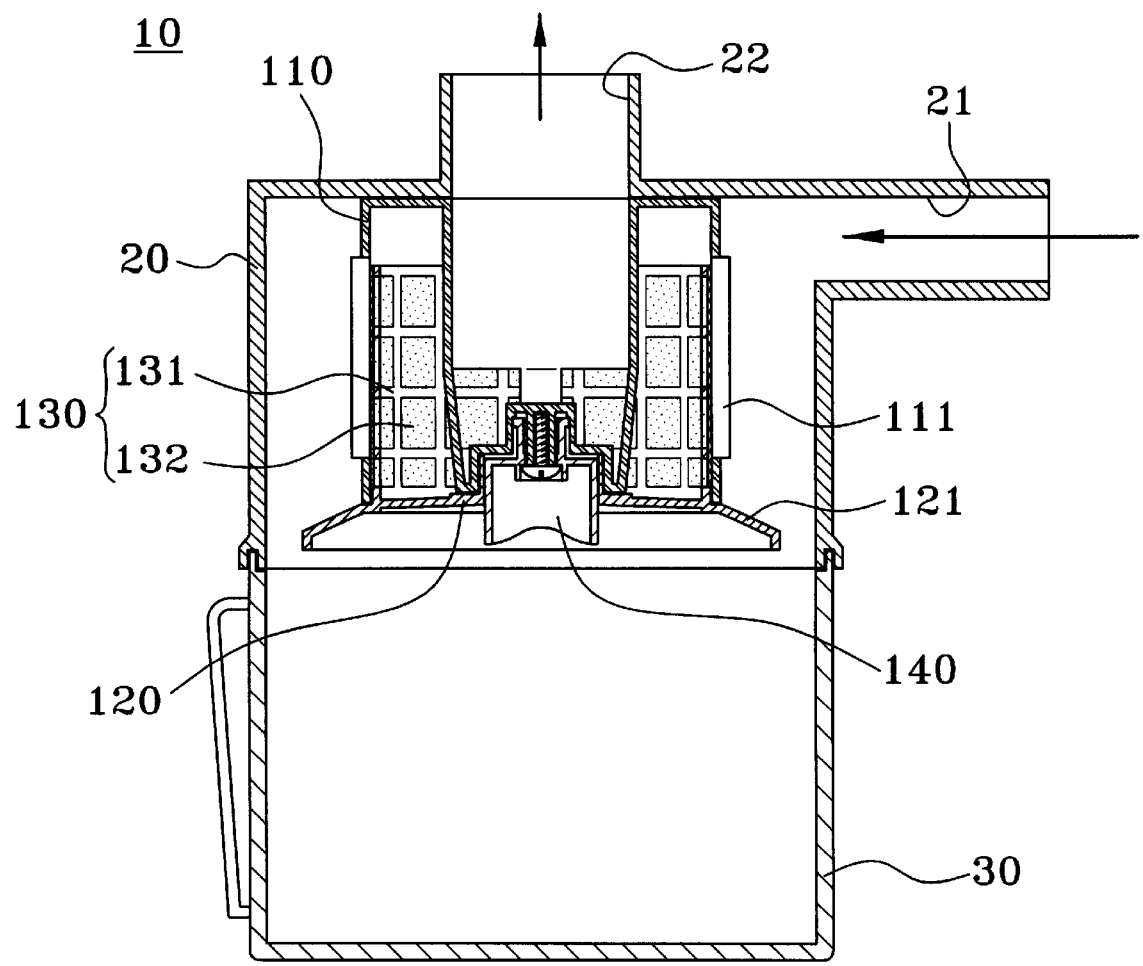
FIG. 5 is a sectional view showing the grill assembly of FIG. 2 being installed at a cyclone dust collecting apparatus.

FIG. 5 is a view showing the grill assembly 100 with the above construction being installed at a cyclone body 20. The grill assembly 100 is removably attached to the cyclone body 20 by a connection member such as a screw (not shown).

When the vacuum-generating device of the vacuum cleaner operates, the whirling air current is formed inside of the cyclone body 20. Various filth included in the whirling air current is separated from the air current by the centrifugal force, and the separated filth is collected in a dust-collecting portion 30.

Some of the filth, which has not been separated from the air current by the centrifugal force in the dust collecting step, whirls along a center of the cyclone body 20 and moves to the grill assembly 100 due to a uprising air current. At this time, some dust included in the air current is reflected after being collided against the dust backflow prevent unit 121 of the sealing member 120, and shifted towards the whirling air current. Thus, the dust is whirled again into the whirling air current.

Remained dust that has not been separated from the uprising air current by the dust backflow prevent unit 121 flows to the passage 111 of the grill assembly 100. The air is drawn into the grill assembly 100 through the passage 111 due to a pressure difference in and out of the grill assembly 100.

The dust included in the air current is filtered by the filter 132, thus only the cleaned air flows to the vacuum-generating device. Therefore, the deterioration of dust collecting function of the vacuum cleaner can be prevented since the dust is drawn to the vacuum-generating device.

According to the grill assembly 100 of the cyclone dust collecting apparatus for a vacuum cleaner of the present invention, the dust cannot be drawn into the vacuum-generating device of the vacuum cleaner through the air discharge passage 22 of the cyclone body 20 along the air current, thus dust collecting function of the vacuum cleaner will be improved.

The grill assembly may further include a cam unit formed around the penetrating hole of the sealing member. This enables the sealing member to be firmly secured to the frill body due to the interrelated movement of the licking knob on the coma unit. Preferably, the cam unit has a higher locking position than unlocking position, with theses positions separated by about 0.5 mm.

So far, the preferred embodiment of the present invention has been illustrated and described. However, the present invention is not limited to the preferred embodiment described herein, and one of ordinary skill in the art can modify the present invention without departing from the true spirit and scope of the present claims.

What is claimed is:

1. A grill assembly of a cyclone dust collecting apparatus for a vacuum cleaner disposed at an upper part of an air discharge passage of a cyclone body for separating dust from a whirling air current by a centrifugal force created by forming the whirling air current from drawn air, the grill assembly preventing dust from being drawn to a vacuum-generating device of the vacuum cleaner, and comprising:

a grill body having a wall and a plurality of passages formed therein; and filtering means disposed along an interior surface of the wall of the grill body for filtering dust drawn into the grill body through the plurality of passages.

2. A vacuum cleaner comprising:

a cyclone dust collecting apparatus for a vacuum cleaner disposed at an upper part of an air discharge passage of a cyclone body for separating dust from a whirling air current by a centrifugal force created by forming the whirling air current from drawn air; and a grill assembly according to claim 1.

3. A grill assembly of a cyclone dust collecting apparatus for a vacuum cleaner, comprising:

a grill body having a plurality of passages formed therein, the grill body having a cylindrical form with openings at both ends;

a sealing member removably connected with the grill body for sealing one opening of the grill body; and filtering means disposed along an interior wall of the grill body for filtering dust drawn into the grill body through the passages.

4. The grill assembly of claim 3, wherein the filtering means comprises:

a filter support portion integrally formed with the sealing member; and a filter attached to the filter support portion.

5. A vacuum cleaner comprising:

a cyclone dust collecting apparatus for a vacuum cleaner disposed at an upper part of an air discharge passage of a cyclone body for separating dust from a whirling air current by a centrifugal force created by forming the whirling air current from drawn air; and a grill assembly according to claim 3.

6. A grill assembly of a cyclone dust collecting apparatus for a vacuum cleaner, comprising:

a grill body having a plurality of passages formed therein, the grill body having a cylindrical form with openings at both ends;

a sealing member for sealing one of the openings of the grill body; and means requiring no special tools for releasably attaching and detaching the sealing member to and from the grill body.

7. A grill assembly of a cyclone dust collecting apparatus for a vacuum cleaner, comprising:

a grill body having a plurality of passages formed therein, the grill body having a cylindrical form with openings at both ends;

a sealing member for sealing one of the openings of the grill body; and means for releasably attaching and detaching the sealing member to and from the grill body, wherein attaching and detaching means comprises:
- a locking knob disposed at a lower part of the grill body; and
- a portion defining a penetrating hole corresponding to the sealing member so that the locking knob can pass therethrough in a certain position.

8. The grill assembly of claim 7, further comprising a cam unit formed around the penetrating hole of the sealing member, so that the sealing member can be firmly secured to the grill body due to an interrelated movement of the locking knob on the cam unit.

9. The grill assembly of claim 8, wherein the cam unit has a higher locking position than an unlocking position, with the positions being separated by a distance of about 0.5 mm.

10. A vacuum cleaner comprising:

a cyclone dust collecting apparatus for a vacuum cleaner disposed at an upper part of an air discharge passage of a cyclone body for separating dust from a whirling air current by a centrifugal force created by forming the whirling air current from drawn air; and a grill assembly according to claim 7.

* * * * *